US012272508B2

(12) United States Patent
Chen et al.

(10) Patent No.: US 12,272,508 B2
(45) Date of Patent: Apr. 8, 2025

(54) ULTRA-MINIATURE HINGE TYPE RELAY HAVING HIGH DIELECTRIC STRENGTH BETWEEN CONTACTS AND LONG SERVICE LIFE

(71) Applicant: Xiamen Hongfa Automotive Electronics Co., Ltd., Xiamen (CN)

(72) Inventors: Zhenghe Chen, Xiamen (CN); Lingyong Wu, Xiamen (CN); Hongbo Chen, Xiamen (CN)

(73) Assignee: Xiamen Hongfa Automotive Electronics Co., Ltd., Xiamen (CN)

( * ) Notice: Subject to any disclaimer, the term of this patent is extended or adjusted under 35 U.S.C. 154(b) by 108 days.

(21) Appl. No.: 18/036,288

(22) PCT Filed: Oct. 12, 2021

(86) PCT No.: PCT/CN2021/123294
§ 371 (c)(1),
(2) Date: May 10, 2023

(87) PCT Pub. No.: WO2022/111085
PCT Pub. Date: Jun. 2, 2022

(65) Prior Publication Data

US 2023/0411095 A1 Dec. 21, 2023

(30) Foreign Application Priority Data

Nov. 24, 2020 (CN) ......................... 202011328806.5

(51) Int. Cl.
*H01H 50/12* (2006.01)
*H01H 50/44* (2006.01)

(52) U.S. Cl.
CPC ............ *H01H 50/12* (2013.01); *H01H 50/44* (2013.01); *H01H 2050/446* (2013.01)

(58) Field of Classification Search
CPC .......................... H01H 2050/446; H01H 50/12
See application file for complete search history.

(56) References Cited

U.S. PATENT DOCUMENTS 6,590,480 B2 * 7/2003 Matsuda ................ H01H 50/12 335/83
8,471,656 B2 * 6/2013 Horii ...................... H01H 50/04 335/78
(Continued)

FOREIGN PATENT DOCUMENTS

CN 201397768 Y 2/2010
CN 205406408 U 7/2016
(Continued)

OTHER PUBLICATIONS

International Search Report dated Jan. 17, 2022 in co-pending PCT Application No. PCT/CN2021/123294.
CN202011328806.5—1st Office Action with English.

*Primary Examiner* — Alexander Talpalatski
(74) *Attorney, Agent, or Firm* — Thomas | Horstemeyer, LLP

(57) ABSTRACT

An ultra-miniature hinge type relay having high dielectric strength between contacts and long service life, including a bobbin, a movable spring armature component, a normally open stationary spring and a normally closed stationary spring; the bobbin including an upper flange, a lower flange and a winding window wound with enameled wires and connected between the upper and lower flange; the upper flange is provided with a normally open stationary spring insertion portion which having a first slot, and a normally closed stationary spring insertion portion having a second slot; the normally open stationary spring is inserted in the first slot and the normally closed stationary spring is inserted in the second slot, at least one ventilation slot is provided on the bobbin corresponding to a direction of movement of the (Continued)

arc generated when contacts are opened, and the ventilation slot is connected between the first and second space.

12 Claims, 12 Drawing Sheets

(56) References Cited

U.S. PATENT DOCUMENTS

| | | | | |
|---|---|---|---|---|
| 8,912,869 | B2 * | 12/2014 | Horii | H01H 50/043<br>335/78 |
| 10,636,600 | B2 * | 4/2020 | Tanaka | H01H 9/043 |
| 2014/0159837 | A1 * | 6/2014 | Hiraiwa | H01H 9/443<br>335/201 |
| 2016/0148739 | A1 * | 5/2016 | Suzuki | H01F 27/325<br>335/299 |

FOREIGN PATENT DOCUMENTS

| | | | |
|---|---|---|---|
| CN | 106558454 | A | 4/2017 |
| CN | 206388653 | U | 8/2017 |
| CN | 109841458 | A | 6/2019 |
| CN | 111261466 | A | 6/2020 |
| CN | 111564337 | A | 8/2020 |
| CN | 211208341 | U | 8/2020 |
| CN | 112563077 | A | 3/2021 |
| CN | 214043547 | U | 8/2021 |
| JP | 2011113780 | A | 6/2011 |

* cited by examiner

ULTRA-MINIATURE HINGE TYPE RELAY HAVING HIGH DIELECTRIC STRENGTH BETWEEN CONTACTS AND LONG SERVICE LIFE

CROSS-REFERENCE TO RELATED APPLICATIONS

The present disclosure is based upon PCT Application No. PCT/CN2021/123294, filed on Oct. 12, 2021, which claims priority to Chinese patent application No. 202011328806.5, titled "Ultra-miniature hinge type relay having high dielectric strength between contacts and long service life", filed on Nov. 24, 2020, the entire contents thereof are incorporated herein by reference.

TECHNICAL FIELD

The present disclosure relates to the technical field of relays, in particular to an ultra-miniature hinge type relay having high dielectric strength between contacts and long service life.

BACKGROUND

The relay is an electronic control device, which has a control system (also called an input loop) and a controlled system (also called an output loop), and is usually used in automatic control circuits, and the relay is actually a kind of "automatic switch" that uses a smaller current to control a larger current. Therefore, it plays the role of automatic adjustment, safety protection, and conversion circuit in the circuit. The hinge type relay is a type of relay whose magnetic circuit system adopts a hinge type structure. With the continuous expansion of relay application fields, the requirements for relays are becoming increasing high, requiring relays to have small size, high dielectric strength between contacts, and long service life.

In the related art, after using the relay for a period of time, due to the ablation of the contacts material, the spatter of the contacts will fall around the contacts, and the dielectric strength between the contacts will be reduced and exceed the lower limit, making the leakage current between the contacts, and resulting in failure. And the contacts will generate arc when they are opened, the arc will ionize the air around the contacts in the relay, which makes the product easy to fail the electrical durability thereof. In order to improve the electrical durability, one way to increase the electrical durability of relays in the related art is to increase the size of the side cavity where the contacts are located, however, this makes the relays more expensive and larger, making it difficult to achieve miniaturization.

SUMMARY

The technical solution adopted by the present disclosure is: an ultra-miniature hinge type relay having high dielectric strength between contacts and long service life, including a bobbin, a base plate, a movable spring armature component, a normally open stationary spring and a normally closed stationary spring; the bobbin including an upper flange, a lower flange and a winding window wound with enameled wires and connected between the upper flange and the lower flange; wherein two opposite sides of the upper flange are respectively provided with a normally open stationary spring insertion portion and a normally closed stationary spring insertion portion that protrude upward; the normally open stationary spring is inserted in a first slot of the normally open stationary spring insertion portion and the normally closed stationary spring is inserted in a second slot of the normally closed stationary spring insertion portion, so that a first portion of the normally open stationary spring with a normally open stationary contact and a second portion of the normally closed stationary spring with a normally closed stationary contact are cooperatively located on a top of the upper flange, and a first space around contacts above the upper flange and a second space at a winding side below the upper flange are separated by the upper flange; a third portion of the movable spring armature component with a movable contact is adapted to be located between the second portion of the normally closed stationary spring with the normally closed stationary contact and the first portion of the normally open stationary spring with the normally open stationary contact; wherein: at least one ventilation slot is provided on the bobbin corresponding to a direction of movement of an arc generated when contacts are opened, and the ventilation slot is connected between the first space around the contacts and the second space at the winding side of the bobbin, so as to use the movement of the arc to conduct air of the first space around the contacts to the second space at the winding side of the bobbin, thereby reducing a degree of ionization of the air in the first space around the contacts and improving the life of the relay.

In some exemplary embodiments, the ventilation slot includes a first ventilation slot provided at a connection between the normally closed stationary spring insertion portion and the upper flange; the first ventilation slot is located below the second slot of the normally closed stationary spring insertion portion, the first end of the first ventilation slot is configured to pass through the normally closed stationary spring insertion portion in a direction pointing towards the normally open stationary spring insertion portion, and reach the top of the upper flange 21 in the first space around the contacts, a second end of the first ventilation slot is configured to pass through the normally closed stationary spring insertion portion in a direction away from the normally open stationary spring insertion portion, and reach the outside of the normally closed stationary spring insertion portion 25; a first recess is provided on an outer side wall of the upper flange corresponding to the second end of the first ventilation slot to enable the second end of the first ventilation slot to be connected to the second space at the winding side.

In some exemplary embodiments, a first rib is provided on the top of the upper flange which is located in the first space around the contacts and at a front side of an opening at the first end of the first ventilation slot to block the spatter generated during contacts ablation from entering the first ventilation slot, so that the first ventilation slot is configured to form a first clean area where the spatter in a creepage path between a normally open contact and a normally closed contact cannot fall in, thereby increasing a dielectric strength between the contacts after testing.

In some exemplary embodiments, the ventilation slot includes a through-hole provided in the upper flange; an upper end of the through-hole is connected to the top of the upper flange which is in the first space around the contacts and a lower end of the through-hole is connected to the second space at the winding side.

In some exemplary embodiments, the through-hole is provided at a position close to an edge of the upper flange.

In some exemplary embodiments, an iron core mounting hole is provided in the middle of the upper flange, and an iron core is assembled in the iron core mounting hole, and an iron core head configured as an iron core pole surface is exposed above the iron core mounting hole; the normally open stationary spring insertion portion and the normally closed stationary spring insertion portion are offset on one side of the upper flange with respect to the iron core mounting hole; a retaining wall is provided between the first space around the contacts and the pole surface of the iron core; the ventilation slot includes a second ventilation slot provided on the retaining wall for connecting the first space around the contacts to the third space around the iron core pole surface.

In some exemplary embodiments, a periphery of the upper flange is provided with a perimeter wall corresponding to the perimeter of the iron core mounting hole; the perimeter wall is provided with a third ventilation slot, one end of the third ventilation slot is connected to the third space around the iron core pole surface and another end of the third ventilation slot is connected to outside of the perimeter wall; a second recess is provided on an outer side wall of the upper flange corresponding to the another end of the third ventilation slot, so that the another end of the third ventilation slot can be connected to the second space at the winding side through the second recess.

In some exemplary embodiments, the normally open stationary spring is inserted upside down in the first slot of the normally open stationary spring insertion portion, and the normally closed stationary spring is inserted upside down in the second slot of the normally closed stationary spring insertion portion, so that pins of the normally open stationary spring and the normally closed stationary spring are configured to protrude upward; the first portion of the normally open stationary spring with the stationary contact is abutted against the top of the upper flange, and the second portion of the normally closed stationary spring with the stationary contact is overhung above the upper flange.

In some exemplary embodiments, the relay further includes the base plate, the base plate is mounted on the top of the normally open stationary spring insertion portion and the normally closed stationary spring insertion portion; a second rib is provided on the base plate at a position close to a side wall of the normally closed stationary spring insertion portion, and the side wall is a side wall of the normally closed stationary spring insertion portion close to the normally open stationary spring insertion portion, and the second rib is configured to protrude downward, so as to block a spatter generated during contacts ablation and splash from adhering to the side wall of the normally closed stationary spring insertion portion close to the normally open stationary spring insertion portion 24, forming a second clean area where the spatter in the creepage path between a normally open contact and a normally closed contact cannot fall in, thereby increasing a dielectric strength between the contacts after testing.

The present disclosure will be further described in detail below with reference to the accompanying drawings and embodiments; However, the ultra-miniature hinge type relay having high dielectric strength between contacts and long service life of the present disclosure is not limited to the embodiments.

DETAILED DESCRIPTION

Figure 1:
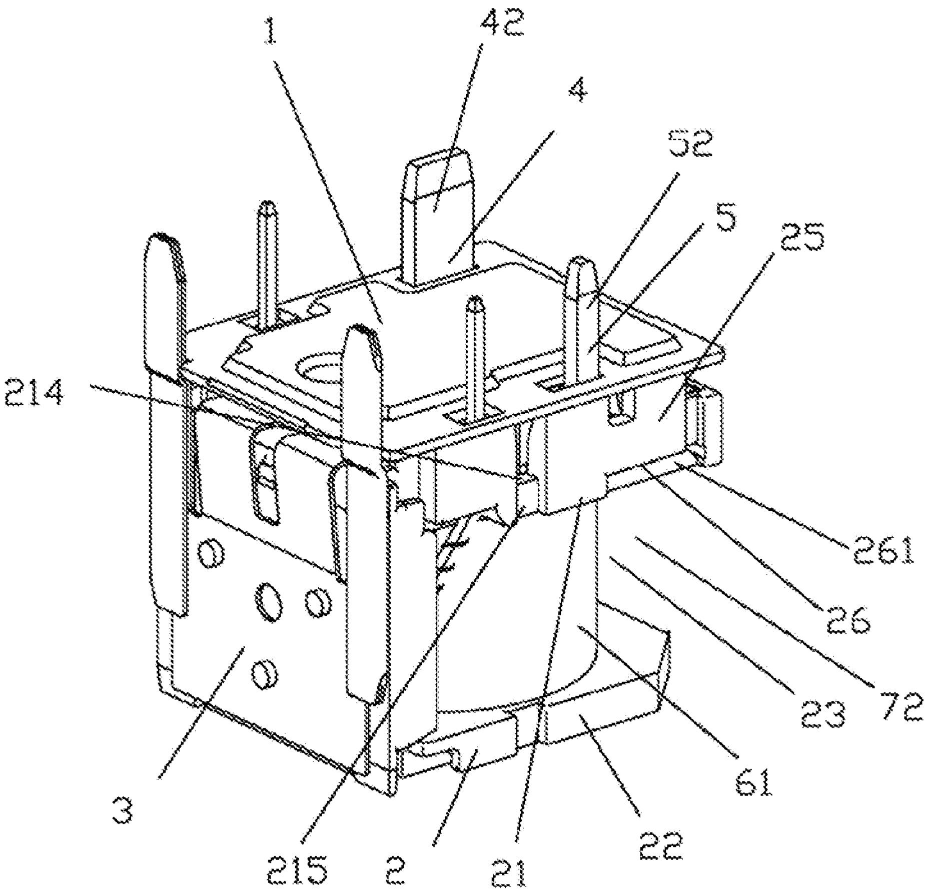
FIG. 1 is a perspective schematic diagram of the relay of the embodiments of the present disclosure (without housing and in an inverted installation state).
Figure 2:
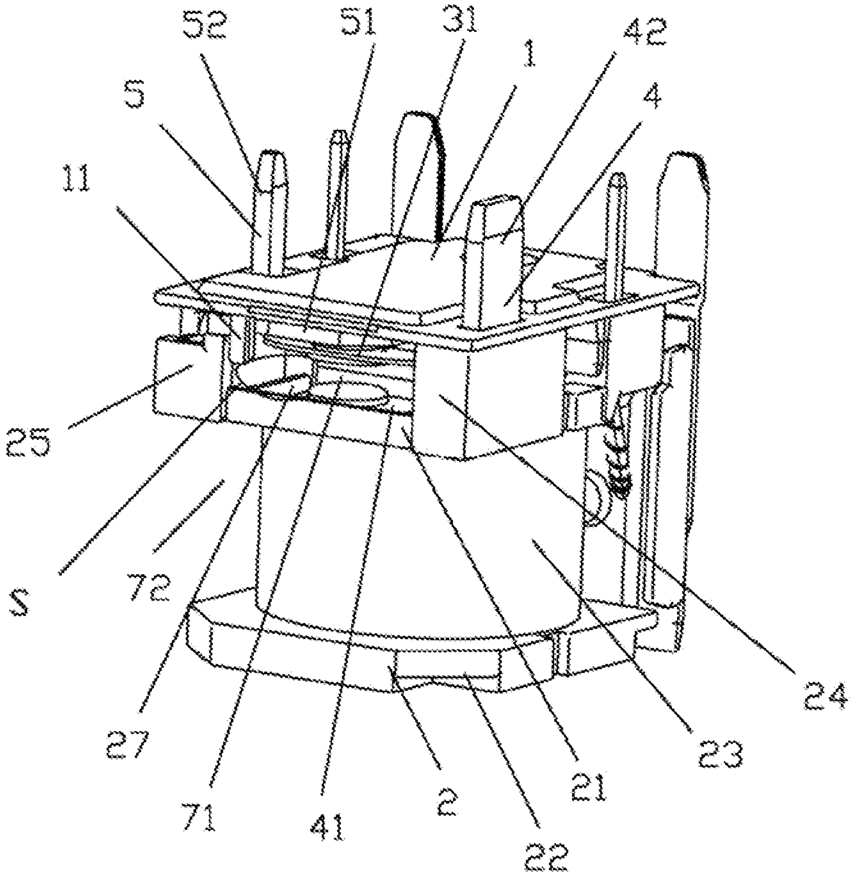
FIG. 2 is a perspective schematic diagram of the relay of the embodiments of the present disclosure (turning an angle, without housing and in an inverted installation state).
Figure 3:
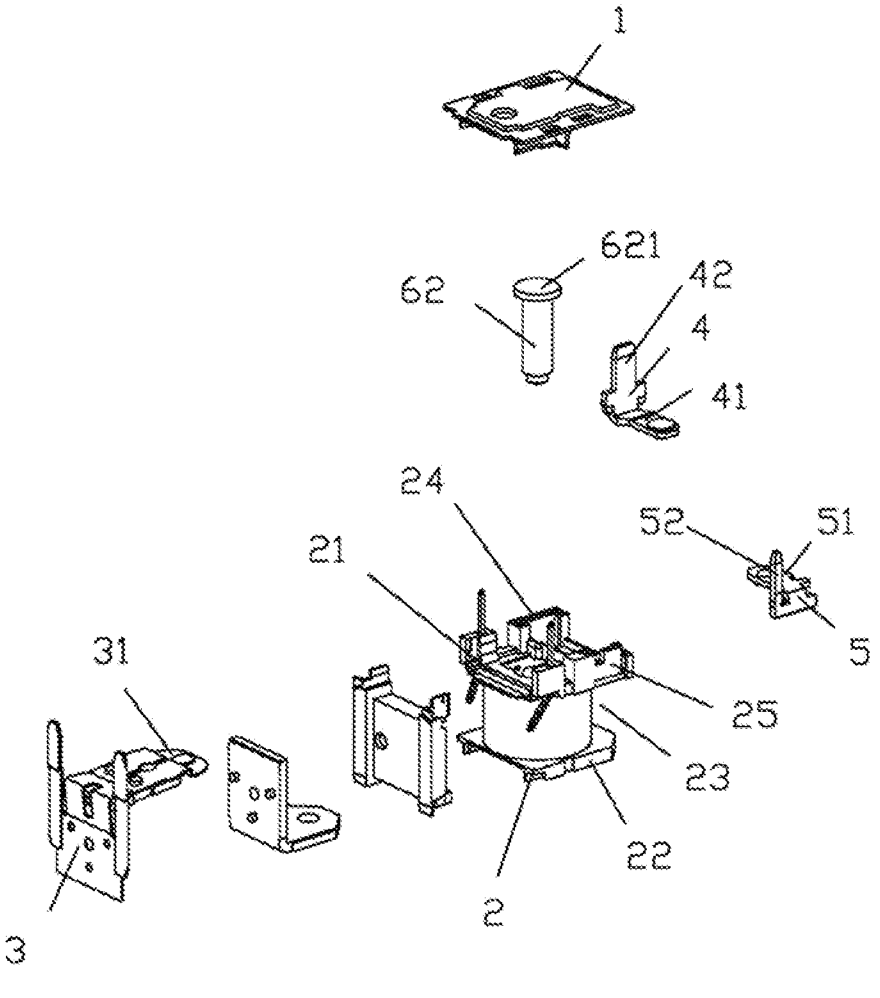
FIG. 3 is an exploded perspective schematic diagram of the relay of the embodiments of the present disclosure (without housing and in an inverted installation fit state).
Figure 4:
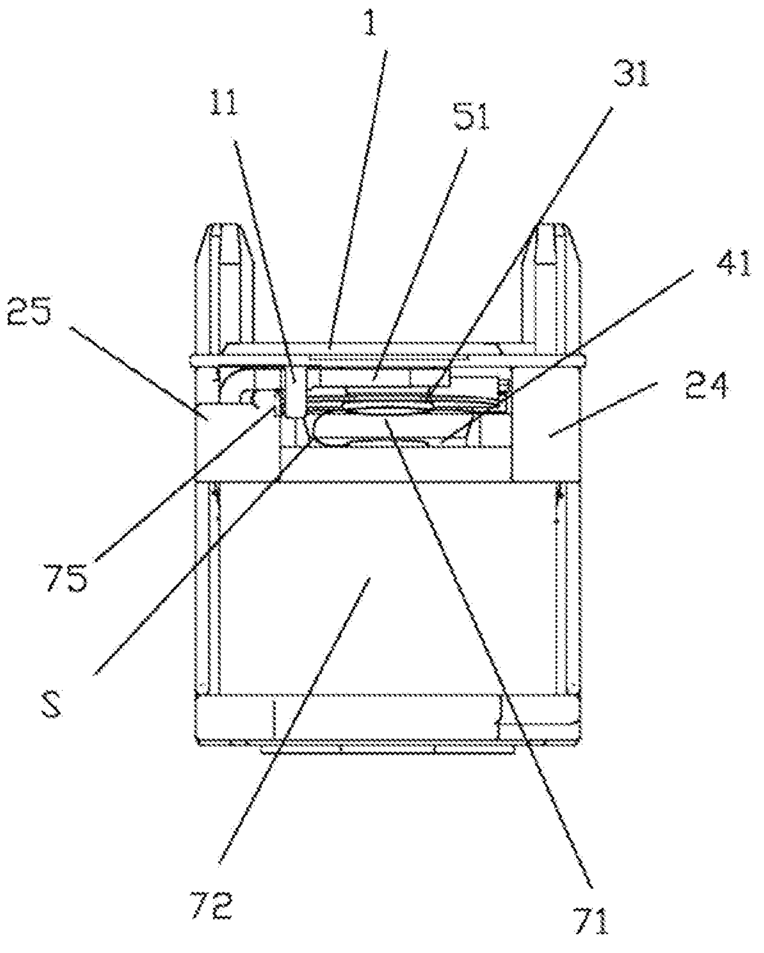
FIG. 4 is a main view of the relay of the embodiments of the present disclosure (without housing and in an inverted installation state).
Figure 5:
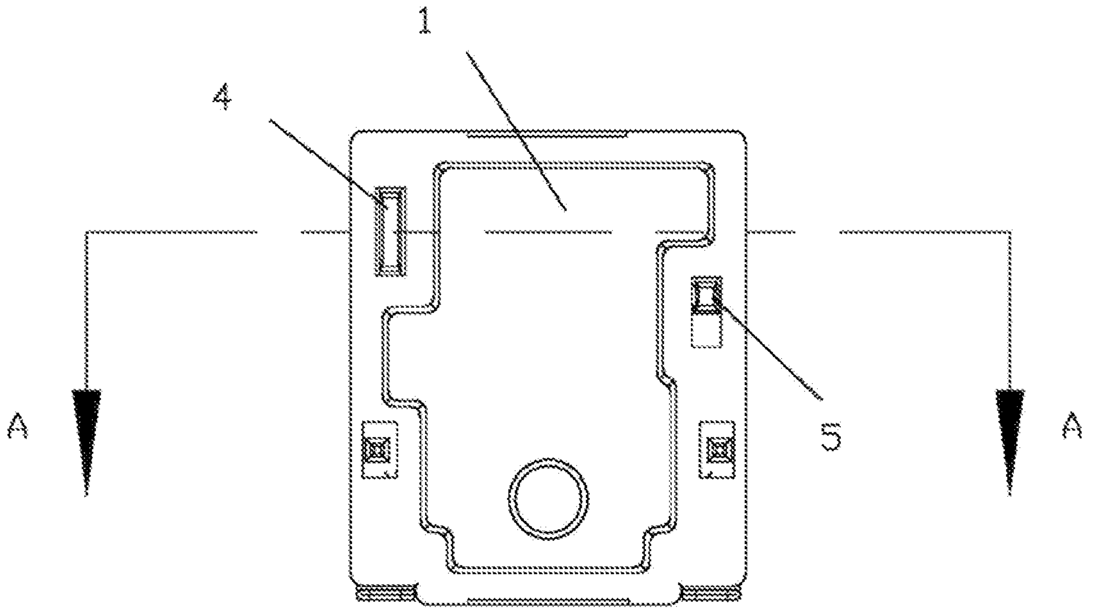
FIG. 5 is a top view of the relay of the embodiments of the present disclosure (without housing and in an inverted installation state).
Figure 6:
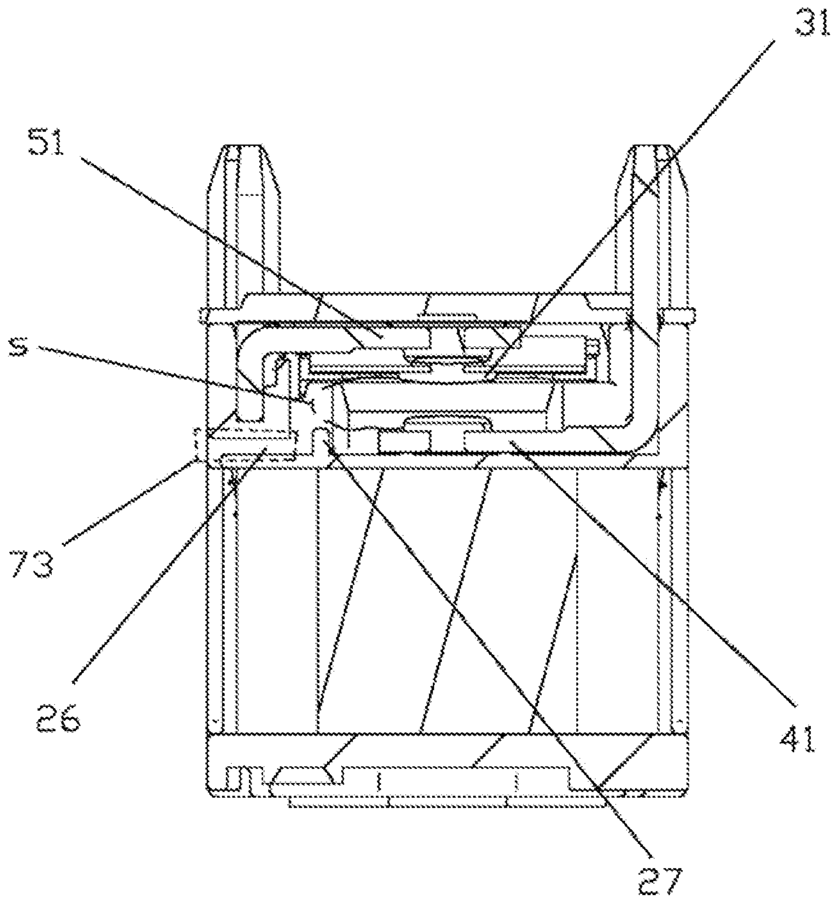
FIG. 6 is a cross-sectional view along line A-A in FIG. 5.
Figure 7:
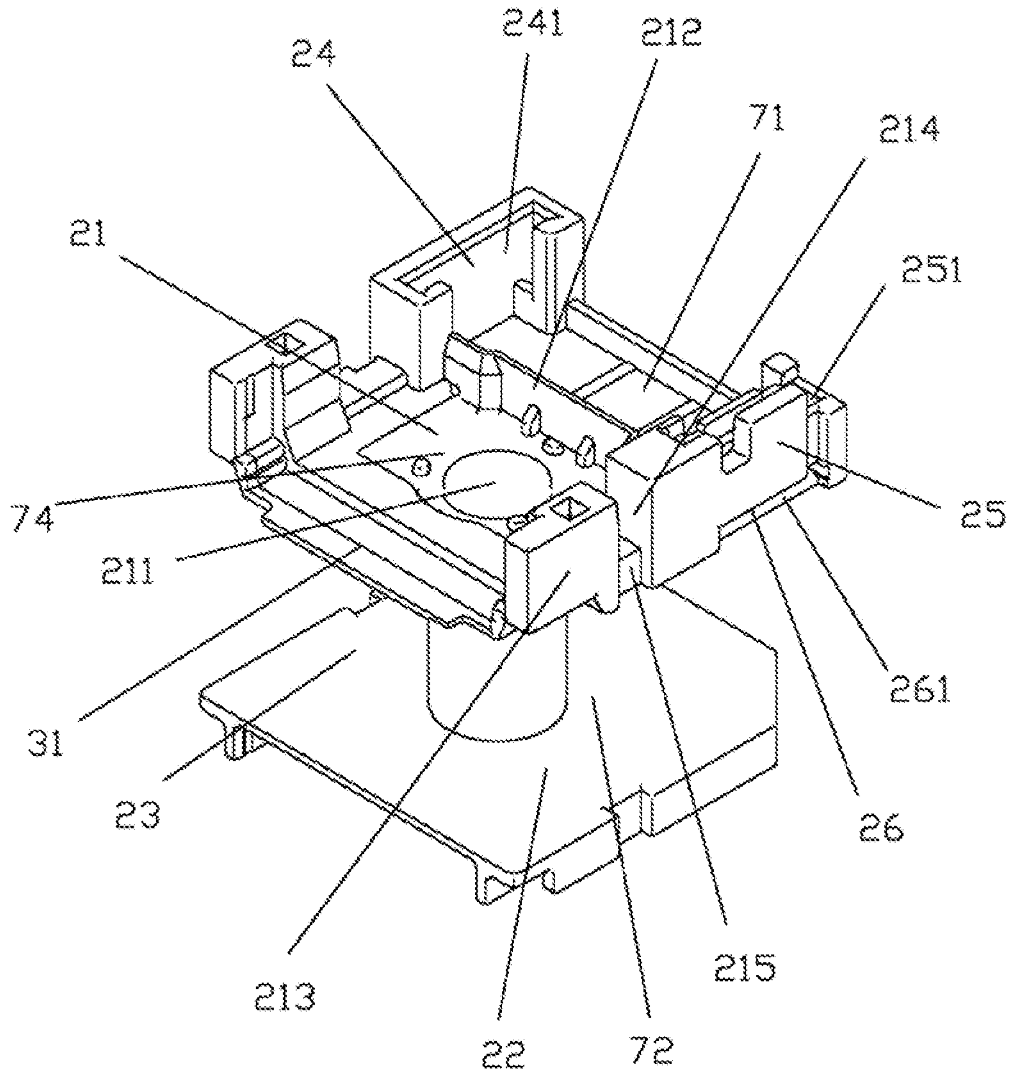
FIG. 7 is a perspective schematic diagram of the bobbin of the embodiments of the present disclosure.
Figure 8:
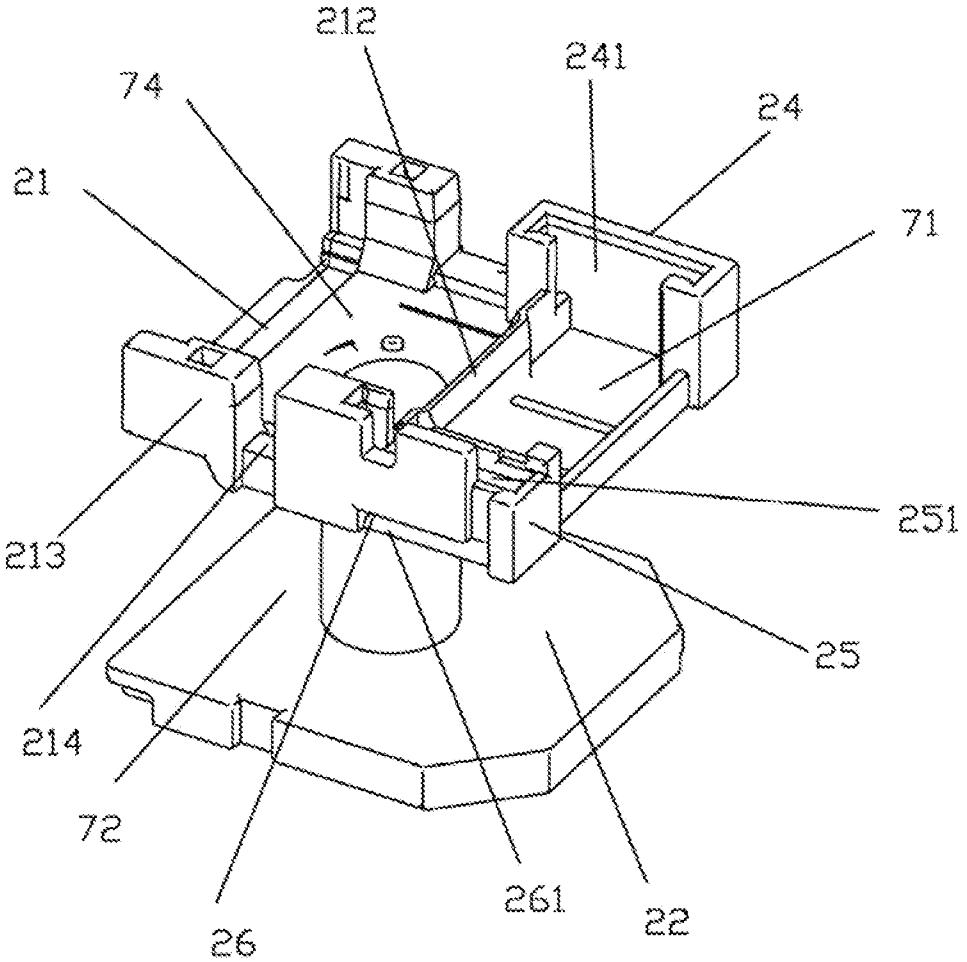
FIG. 8 is a perspective schematic diagram of the bobbin of the embodiments of the present disclosure (turning an angle).
Figure 9:
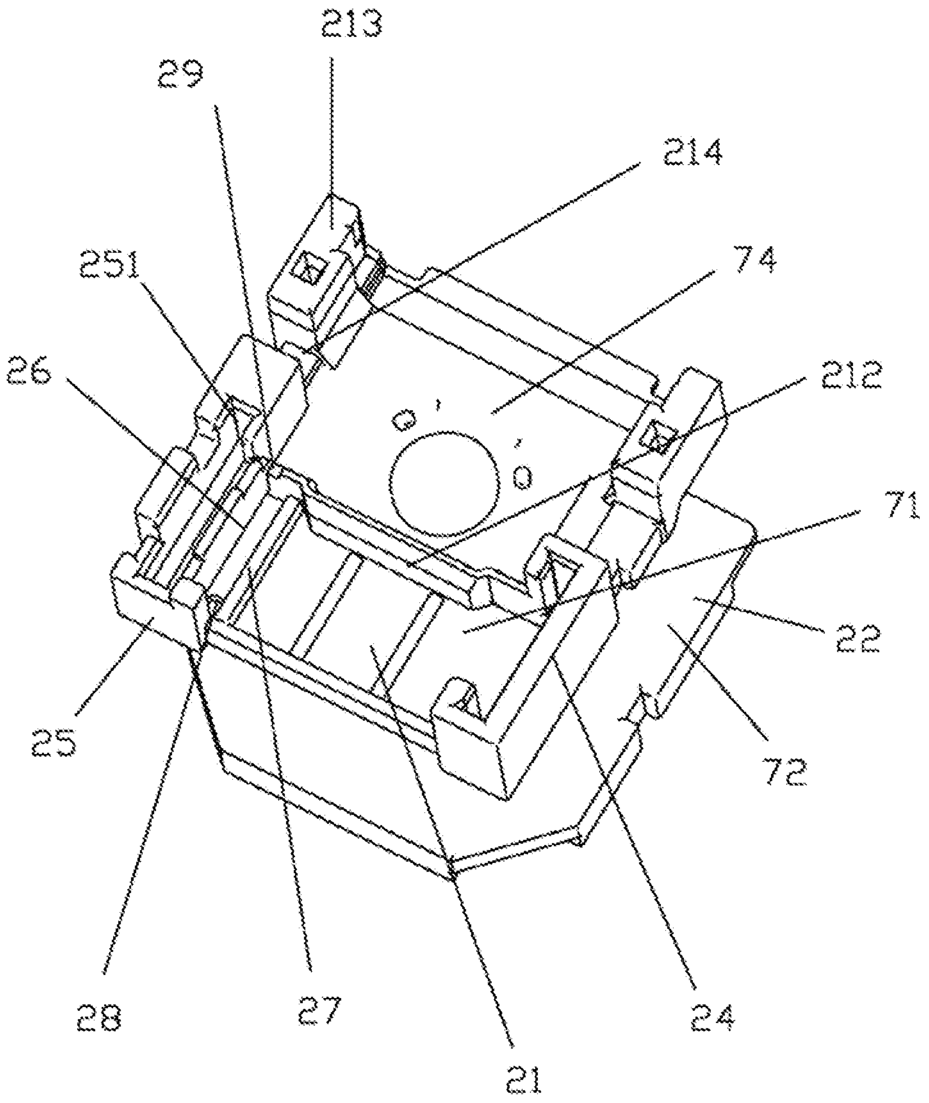
FIG. 9 is a perspective schematic diagram of the bobbin of the embodiments of the present disclosure (turning another angle).

Refer to FIGS. 1 to 14, an ultra-miniature hinge type relay having high dielectric strength between contacts and long service life is provided by the present disclosure, the relay of the embodiment is provided with an inverted installation structure, of course, the relay can also be of other assembly structures such as the upright or lateral mounting. As shown in FIG. 1, the relay includes a bobbin 2, a base plate 1, a movable spring armature component 3, a normally open stationary spring 4 and a normally closed stationary spring 5; the bobbin 2 includes an upper flange 21, a lower flange 22 and a winding window 23 connected between the upper flange 21 and the lower flange 22, and enameled wires 61 are wound in the winding window 23. The normally open stationary spring 4 and the normally closed stationary spring 5 are inserted upside down in the upper flange 21, respectively, as shown in FIG. 3, the two opposite sides of the upper flange 21 are respectively provided with a normally open stationary spring insertion portion 24 and a normally closed stationary spring insertion portion 25 that protrude upward. As shown in FIG. 2 and FIG. 7, the normally open stationary spring 4 is inserted and fitted into a first slot 241 of the normally open stationary spring insertion portion 24, and the first portion 41 of the normally open stationary spring 4 with a normally open stationary contact is abutted against the upper surface of the upper flange 21. As shown in FIGS. 2 to 3 and FIG. 9, the normally closed stationary spring 5 is inserted and fitted into a second slot 251 of the normally closed stationary spring insertion portion 25, and the second portion 51 of the normally closed stationary spring 5 with a normally closed stationary contact is overhung above the upper flange 21. As shown in FIG. 2 and FIG. 4, the first portion 41 of the normally open stationary spring 4 with a normally open stationary contact and the second portion 51 of the normally closed stationary spring 5 with a normally closed stationary contact are cooperatively located on the top of the upper flange 21, and so that the first space 71 around the contacts above the upper flange 21 and the second space 72 at the winding side below the upper flange 21 are separated by the upper flange 21. As shown in FIG. 4 and FIG. 6, the third portion 31 of the movable spring armature component 3 with a movable contact is adapted to be located between the second portion 51 of the normally closed stationary spring 5 with a normally closed stationary contact and the first portion 41 of the normally open stationary spring 4 with a normally open stationary contact. As shown in FIG. 2, the base plate 1 is mounted on the top of the normally open stationary spring insertion portion 24 and the normally closed stationary spring insertion portion 25. at least one ventilation slot is provided on the bobbin 2 corresponding to the direction of movement of the arc generated when the contacts are opened, and the ventilation slot is connected between the first space 71 around the contacts and the second space 72 at the winding side of the bobbin 2, so as to use the movement of the arc to conduct the air of the first space 71 around the contacts to the second space 72 at the winding side of the bobbin 72, thereby reducing the degree of ionization of the air in the first space 71 around the contacts and improving the life of the product.

In the embodiment, as shown in FIG. 1, the normally open stationary spring 4 is inserted upside down in the first slot 241 of the normally open stationary spring insertion portion 24, so that pin 42 of the normally open stationary spring 4 protrudes upward, the normally closed stationary spring 5 is inserted upside down in the second slot 251 of the normally closed stationary spring insertion portion 25, so that the pin 52 of the normally closed stationary spring 5 protrude upwards. As shown in FIG. 6, the first portion 41 of the normally open stationary spring 4 with a normally open stationary contact is in contact with the top of the upper flange 21, and the second portion 51 of the normally closed stationary spring 5 with a normally closed stationary contact is overhung above the upper flange 21.

In the embodiment, as shown in FIG. 6 and FIG. 7, one of the at least one ventilation slot is a first ventilation slot 26 provided at the connection between the normally closed stationary spring insertion portion 25 and the upper flange 21. the first ventilation slot 26 is located below the second slot 251 of the normally closed stationary spring insertion portion 25, as shown in FIG. 6, the first ventilation slot 26 is a through slot in the first direction F1, that is, in the first direction F1, the first ventilation slot 26 has a first end 262 and a second end 263, the first end 262 of the first ventilation slot 26 is configured to pass through the normally closed stationary spring insertion portion 25 in a direction pointing towards the normally open stationary spring insertion portion 24, and reach the top of the upper flange 21 in the first space 71 around the contacts, the second end 263 of the first ventilation slot 26 is configured to pass through the normally closed stationary spring insertion portion 25 in a direction away from the normally open stationary spring insertion portion 24, and reach the outside of the normally closed stationary spring insertion portion 25. A first recess 261 is provided on the outer side wall of the upper flange 21 corresponding to the second end 263 of the first ventilation slot 26 to enable the second end 263 of the first ventilation slot 26 to be connected to the second space 72 at the winding side. When the contacts are opened at the normally open end, that is, when the stationary contact of the normally open stationary spring 4 changes from the closed to the open state with the movable contact of the third portion 31 of the movable spring armature component 3, the first ventilation slot 26 enables the air around the contacts to be quickly channeled through the first ventilation slot 26 to the second space 72 at the winding side. As shown in FIG. 2, when the contacts are opened at the normally open end, whether the current flows in from the normally open stationary spring 4 and out from the movable spring of the movable spring armature component 3 or flows in from the movable spring of the movable spring armature component 3 and out from the normally open stationary spring 4, the arc S, under the action of the magnetic field, is elongated in the direction close to the normally closed stationary spring 5 and is eventually broken.

In the embodiment, as shown in FIG. 6, a first rib 27 is also provided on the top of the upper flange 21 which is located in the first space 71 around the contacts and at the front side of the first end 262 of the first ventilation slot 26 to block the spatter generated during contacts ablation from entering the first ventilation slot 26, so that the first ventilation slot 26 forms a first clean area 73 where the spatter in the creepage path between the normally open contact and the normally closed contact cannot fall in, thereby increasing the dielectric strength between the contacts after the test.

Figure 10:
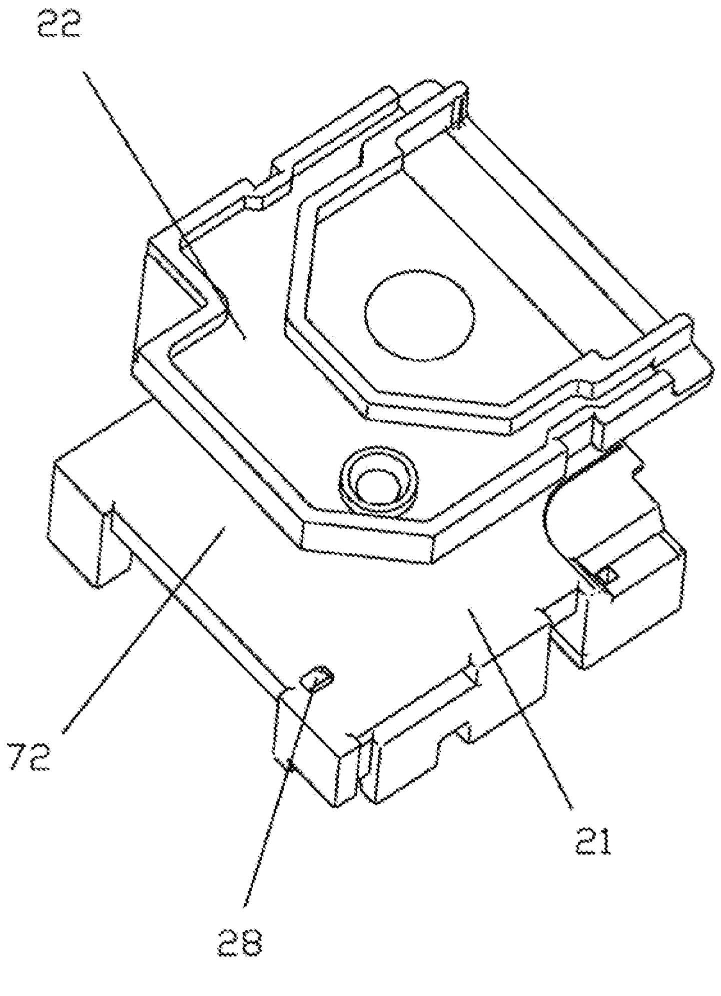
FIG. 10 is a perspective schematic diagram of the bobbin of the embodiments of the present disclosure (flip an angle).
Figure 11:
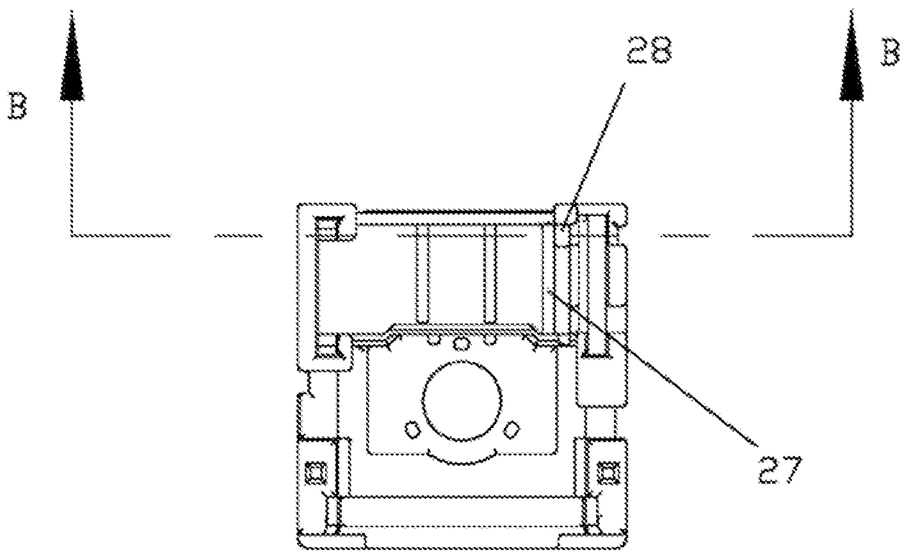
FIG. 11 is a top view of the bobbin of the embodiments of the present disclosure.
Figure 12:
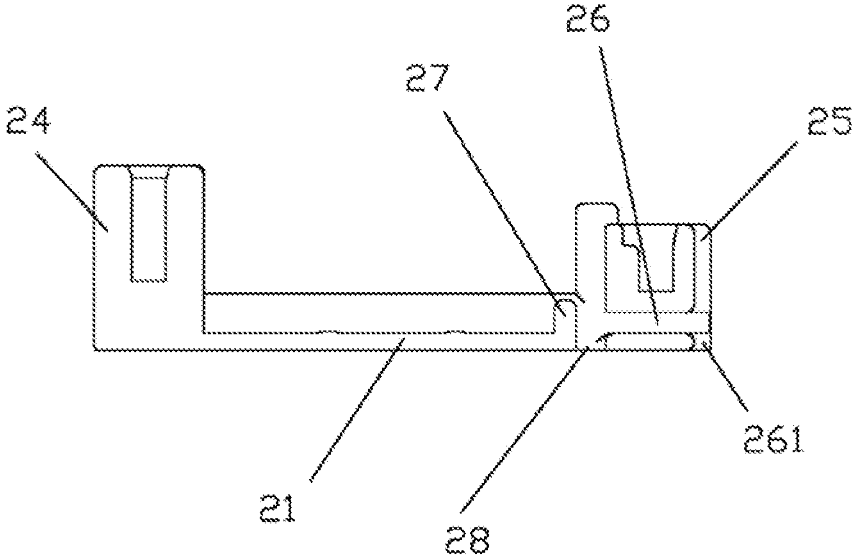
FIG. 12 is a cross-sectional view along line B-B in FIG. 11.
Figure 13:
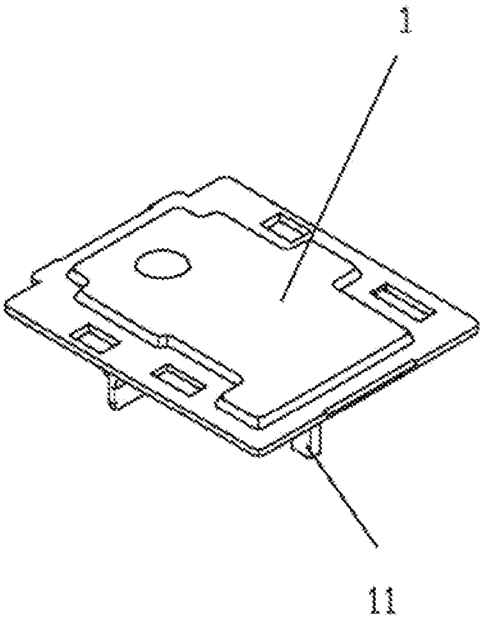
FIG. 13 is a perspective schematic diagram of the base board of the embodiments of the present disclosure.

In the embodiment, as shown in FIG. 9 to FIG. 10 and FIG. 12, the other of the at least one ventilation slot is a through-hole 28 provided in the upper flange 21. The upper end of the through-hole 28 is connected to the top of the upper flange 21 which is in the first space 71 around the contacts and the lower end of the through-hole 28 is connected to the second space 72 at the winding side.

In the embodiment, as shown in FIG. 12, in the case where there is the first rib 27 and the first ventilation slot 26, the through-hole 28 is located at a position between the opening of the first end 262 of the first ventilation slot 26 and the first rib 27.

In the embodiment, as shown in FIG. 10, the through-hole 28 is provided at a position close to the edge of the upper flange 21. The purpose of arranging the through-hole 28 at a position close to the edge of the upper flange 21 is to position the through-hole 28 away from the enameled wire, and for this reason to improve the creepage distance between the contacts and the enameled wire.

In the embodiment, as shown in FIG. 3 and FIG. 7, an iron core mounting hole 211 is provided in the middle of the upper flange 21, and an iron core 62 is assembled in the iron core mounting hole 211, and the iron core head 621 configured as an iron core pole surface is exposed above the iron core mounting hole 211. The normally open stationary spring insertion portion 24 and the normally closed stationary spring insertion portion 25 are offset on one side of the upper flange 21 with respect to the iron core mounting hole 211. As shown in FIG. 7, a retaining wall 212 is provided between the first space 71 around the contacts and the pole surface of the iron core. As shown in FIG. 9, another ventilation slot of the at least one ventilation slot is a second ventilation slot 29 provided on the retaining wall 212 for connecting the first space 71 around the contacts to the third space 74 around the iron core pole surface, and the second ventilation slot 29 is located close to the normally closed stationary spring insertion portion 25. The periphery of the upper flange 21 is provided with a perimeter wall 213 corresponding to the perimeter of the iron core mounting hole 211. As shown in FIG. 8, the perimeter wall 213 is provided with a third ventilation slot 214, one end of the third ventilation slot 214 is connected to the third space 74 around the iron core pole surface and the other end of the third ventilation slot 214 is connected to the outside of the perimeter wall 213. As shown in FIG. 7, a second recess 215 is provided on the outer side wall of the upper flange 21 corresponding to the other end of the third ventilation slot 214, so that the other end of the third ventilation slot 214 can be connected to the second space 72 at the winding side through the second recess 215.

Figure 14:
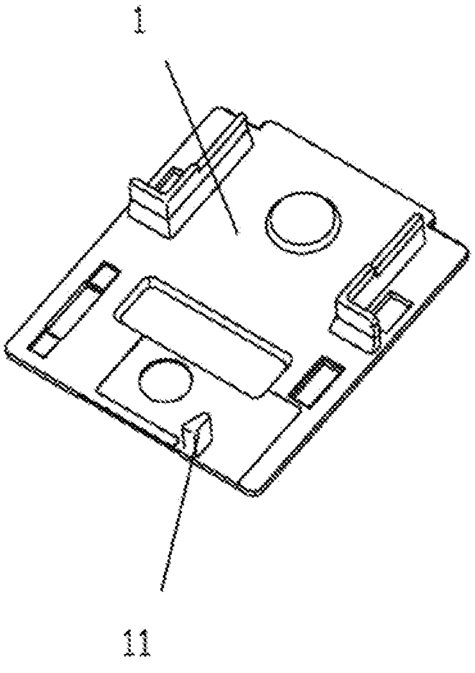
FIG. 14 is a perspective schematic diagram of the base board of the embodiments of the present disclosure (flipping one side).

In the embodiment, as shown in FIG. 4 and FIG. 14, a second rib 11 is provided on the base plate 1 at a position close to the side wall of the normally closed stationary spring insertion portion 25, and the side wall is a side wall of the normally closed stationary spring insertion portion 25 close to the normally open stationary spring insertion portion 24 and the second rib 11 is configured to protrude downward, so as to block the spatter generated during contacts ablation and splash from adhering to the side wall of the normally closed stationary spring insertion portion 25, forming a second clean area 75 where the spatter in the creepage path between the normally open contact and the normally closed contact cannot fall in, thereby increasing the dielectric strength between the contacts after the test.

In the embodiment, the number of the ventilation slots is three, the first one is the first ventilation slot 26 and the first recess 261, the second one is the through-hole 28, the third one is the second ventilation slot 29, the third ventilation slot 214 and the second recess 215. Of course, it is possible to use only one of the ventilation slots, or any combination of two of them. In the embodiment, the first ventilation slot 26 and the first recess 261 are arranged in the normally closed stationary spring insertion portion 25, which enables the air around the contacts to be quickly channeled through the first ventilation slot 26 to the second space 72 at the winding side when the contacts are opened from the normally open end. When it is necessary to achieve the contacts are opened from the normally closed end, to quickly channel the air around the contacts to the second space 72 at the winding side through the first ventilation slot 26, it is necessary to arrange the first ventilation slot 26 in the normally open stationary spring insertion portion 24. Because the load of the conversion type NO (normally open end) will generally be larger than that of the conversion type NC (normally closed end), and the contact splash situation of the conversion type NO will also be more serious than that of the conversion type NC, and the problem of insufficient voltage withstand of the conversion type NO appears prominent after the test, the embodiment adopts the arrangement described above. Therefore, such an arrangement can better achieve rapid conduction of air around the contacts through the first ventilation slot 26 to the second space 72 at the winding side when the contacts are opened at the normally open end. In the embodiment, the location of the through-hole 28 at the position between the first end 262 of the first ventilation slot 26 and the first rib 27, and the location of the second ventilation slot 29 near the normally closed stationary spring insertion portion 25, both to achieve rapid conduction of air around the contacts through the first ventilation slot 26 into the second space 72 at the winding side when the contacts are opened at the normally open end. When it is necessary to achieve the contacts are opened from the normally closed end, to quickly channel the air around the contacts to the second space 72 at the winding side, it is necessary to arrange the same structure in the normally open stationary spring insertion portion 24.

In the ultra-miniature hinge type relay having high dielectric strength between contacts and long service life of the present disclosure, at least one ventilation slot is provided on the bobbin 2, which corresponds to the direction of the movement of the arc when the contacts are opened, and the ventilation slot is connected between the first space 71 around the contacts and the second space 72 at the winding side of the bobbin. This structure of the present disclosure makes it possible to reduce the degree of air ionization in the first space 71 around the contacts by using air exchange between the first space 71 around the contacts and the second space 72 at the winding side of the bobbin, thereby increasing the service life of the product. The arc movement generated from the contacts drives the air around the contact to flow quickly to the winding side through the ventilation slot, reducing the degree of air ionization around the contacts and making the electrical durability of the product less prone to failure, and avoiding reducing the degree of air ionization by sacrificing the volume around the contacts in the related art, thus achieving miniaturization.

In the ultra-miniature hinge type relay having high dielectric strength between contacts and long service life of the present disclosure, a first ventilation slot 26 is provided at the connection between the normally closed stationary spring insertion portion 25 and the upper flange 21; the first ventilation slot 26 is located below the second slot 251 of the normally closed stationary spring insertion portion 25, the first end 262 of the first ventilation slot 26 is configured to pass through the normally closed stationary spring insertion portion 25 in a direction pointing towards the normally open stationary spring insertion portion 24, and reach the top of the upper flange 21 in the first space 71 around the contacts, the second end 263 of the first ventilation slot 26 is configured to pass through the normally closed stationary spring insertion portion 25 in a direction away from the normally open stationary spring insertion portion 24, and reach the outside of the normally closed stationary spring insertion portion 25. A first recess 261 is provided on the outer side wall of the upper flange 21 corresponding to the second end 263 of the first ventilation slot 26 to enable the second end 263 of the first ventilation slot 26 to be connected to the second space 72 at the winding side. This structure of the present disclosure is to design the first ventilation slot 26 at the side of the bobbin 2 which is for the normally closed stationary spring inserting in, which enables the air around the contacts to be quickly conducted to the second space 72 at the winding side through the first ventilation slot 26 when the contacts are opened from the normally open end. when the contacts are opened at the normally open end, whether the current flows in from the normally open stationary spring end and out from the movable spring end (i.e. the switching contact side, the switching contact side can be understood as the movable contact side) or flows in from the movable spring end (i.e. the switching contact side) and out from the normally open stationary spring end, the arc is affected by the magnetic field generated by the normally open stationary spring, the arc moves toward the side of the normally closed stationary spring and is stretched until the arc is broken. In this way, the first ventilation slot 26 is arranged on the side in the direction of arc movement, connecting the air on the contacts side (i.e., the first space 71 around the contacts) and the enameled wire side (i.e., the second space 72 at the winding side), which can reduce the degree of ionization at the contacts side and improve the electrical life. Moreover, the first ventilation slot 26 increases the creepage distance between the normally open contacts and the normally closed contacts, thus improving the dielectric strength between contacts after testing of the relay product.

In the ultra-miniature hinge type relay having high dielectric strength between contacts and long service life of the present disclosure, a first rib 27 is also provided on top of the upper flange 21 which is located in the first space 71 around the contacts and at the front side of the first end 262 of the first ventilation slot 26. This structure of the present disclosure allows the use of the first rib 27 to block the spatter generated during contacts ablation from entering the first ventilation slot 26, so that the first ventilation slot 26 forms a first clean area 73 where the spatter in the creepage path between the normally open contact and the normally closed contact cannot fall in, thereby increasing the dielectric strength between the contacts after the test.

In the ultra-miniature hinge type relay having high dielectric strength between contacts and long service life of the present disclosure, a through-hole 28 is provided in the upper flange 21, and the upper end of the through-hole 28 is connected to the top of the upper flange 21 in the first space 71 around the contacts and the lower end of the through-hole 28 is connected to the second space 72 at the winding side, the through-hole 28 is located between the opening at the first end 262 of the first ventilation slot 26 and the first rib 27. In this structure of the present disclosure, a through-hole 28 is provided in the bobbin 2, and the through-hole 28 is provided at the normally closed stationary spring side to connect the air at the contacts side and the enameled wire side to reduce the degree of ionization of the air at the contacts side and improve the electric life.

In the ultra-miniature hinge type relay having high dielectric strength between contacts and long service life of the present disclosure, a second ventilation slot 29 is provided on the retaining wall 212 for connecting the first space 71 around the contacts to the third space 74 around the iron core pole surface, and a third ventilation slot 214 is provided on the perimeter wall 213. A second recess 215 is provided on the outer side wall of the upper flange 21 corresponding to the other end of the third ventilation slot 214. The second ventilation slot 29 is used to make the air at the contacts side and the air at the iron core side circulate with each other, and then the air at the iron core side and the air at the enameled wire side circulate with each other through the third ventilation slot 214 and the second recess 215, thereby reducing the degree of ionization of the air on the contacts side and improving the electrical durability of the test.

In the ultra-miniature hinge type relay having high dielectric strength between contacts and long service life of the present disclosure, a second rib 11 is provided on the base plate 1 at a position close to the side wall of the normally closed stationary spring insertion portion 25, and the side wall is a side wall of the normally closed stationary spring insertion portion 25 close to the normally open stationary spring insertion portion 24, and the second rib 11 is protruding downward. The structure of the present disclosure can be used to block the spatter generated during contacts ablation and splash from adhering to the side wall of the normally closed stationary spring insertion portion 25, forming a second clean area where spatter in the creepage path between the normally open contact and the normally closed contact cannot fall in, thereby increasing the dielectric strength between the contacts after the test.

In the present disclosure, qualifiers involving orientation, such as up/top, down/lower/bottom, and front, indicate only the relative position of the parts in relation to each other or to the structures within the parts. For example, the upper flange and the lower flange of the bobbin refer to the upper and lower directions of the normally open stationary spring and normally closed stationary springs when they are mounted upside down. When the relay is in use (usually the pins of the normally open stationary spring and normally closed stationary springs are facing down), the upper flange is at the bottom and the lower flange is at the top. When the relay is in a lateral mounting state of use, the upper flange can be on the left and the lower flange can be on the right, or the upper flange on the right and the lower flange on the left, or the upper flange on the front and the lower flange on the rear, or the upper flange on the rear and the lower flange on the front.

The content described above is only a preferred embodiment of the present disclosure and is not intended to limit the present disclosure in any way. Although the present disclosure has been disclosed as described above in a preferred embodiment, it is not intended to limit the present disclosure. Any person skilled in the art can make many possible variations and modifications to the technical solutions of this disclosure, or modify them to equivalent embodiments of equivalent assimilation, using the technical content revealed above, without departing from the scope of the technical solutions of this disclosure. Therefore, any simple modifications, equivalent changes and modifications made to the above embodiments based on the technical substance of the present disclosure without departing from the content of the technical solutions of the present disclosure shall fall within the scope of protection of the technical solutions of the present disclosure.

What is claimed is:

1. An ultra-miniature hinge type relay having high dielectric strength between contacts and long service life, comprising a bobbin, a movable spring armature component, a normally open stationary spring and a normally closed stationary spring; the bobbin comprising an upper flange, a lower flange and a winding window wound with enameled wires and connected between the upper flange and the lower flange; wherein two opposite sides of the upper flange are respectively provided with a normally open stationary spring insertion portion and a normally closed stationary spring insertion portion that protrude upward; the normally open stationary spring is inserted in a first slot of the normally open stationary spring insertion portion and the normally closed stationary spring is inserted in a second slot of the normally closed stationary spring insertion portion, so that a first portion of the normally open stationary spring with a normally open stationary contact and a second portion of the normally closed stationary spring with a normally closed stationary contact are cooperatively located on a top of the upper flange, and a first space around contacts above the upper flange and a second space at a winding side below the upper flange are separated by the upper flange; a third portion of the movable spring armature component with a movable contact is adapted to be located between the second portion of the normally closed stationary spring with the normally closed stationary contact and the first portion of the normally open stationary spring with the normally open stationary contact; wherein: at least one ventilation slot is provided on the bobbin corresponding to a direction of movement of an arc generated when contacts are opened, and the ventilation slot is connected between the first space around the contacts and the second space at the winding side of the bobbin, so as to use the movement of the arc to conduct air of the first space around the contacts to the second space at the winding side of the bobbin, thereby reducing a degree of ionization of the air in the first space around the contacts and improving the life of the relay, wherein the ventilation slot comprises a through-hole provided in the upper flange; an upper end of the through-hole is connected to the top of the upper flange which is in the first space around the contacts and a lower end of the through-hole is connected to the second space at the winding side.

2. An ultra-miniature hinge type relay having high dielectric strength between contacts and long service life, comprising a bobbin, a movable spring armature component, a normally open stationary spring and a normally closed stationary spring; the bobbin comprising an upper flange, a lower flange and a winding window wound with enameled wires and connected between the upper flange and the lower flange; wherein two opposite sides of the upper flange are respectively provided with a normally open stationary spring insertion portion and a normally closed stationary spring insertion portion that protrude upward; the normally open stationary spring is inserted in a first slot of the normally open stationary spring insertion portion and the normally closed stationary spring is inserted in a second slot of the normally closed stationary spring insertion portion, so that a first portion of the normally open stationary spring with a normally open stationary contact and a second portion of the normally closed stationary spring with a normally closed stationary contact are cooperatively located on a top of the upper flange, and a first space around contacts above the upper flange and a second space at a winding side below the upper flange are separated by the upper flange; a third portion of the movable spring armature component with a movable contact is adapted to be located between the second portion of the normally closed stationary spring with the normally closed stationary contact and the first portion of the normally open stationary spring with the normally open stationary contact; wherein: at least one ventilation slot is provided on the bobbin corresponding to a direction of movement of an arc generated when contacts are opened, and the ventilation slot is connected between the first space around the contacts and the second space at the winding side of the bobbin, so as to use the movement of the arc to conduct air of the first space around the contacts to the second space at the winding side of the bobbin, thereby reducing a degree of ionization of the air in the first space around the contacts and improving the life of the relay, wherein the ventilation slot comprises a first ventilation slot provided at a connection between the normally closed stationary spring insertion portion and the upper flange; the first ventilation slot is located below the second slot of the normally closed stationary spring insertion portion, a first end of the first ventilation slot is configured to pass through the normally closed stationary spring insertion portion in a direction pointing towards the normally open stationary spring insertion portion, and reach the top of the upper flange in the first space around the contacts, a second end of the first ventilation slot is configured to pass through the normally closed stationary spring insertion portion in a direction away from the normally open stationary spring insertion portion, and reach the outside of the normally closed stationary spring insertion portion; a first recess is provided on an outer side wall of the upper flange corresponding to the second end of the first ventilation slot to enable the other end of the first ventilation slot to be connected to the second space at the winding side.

3. The hinge type relay according to claim 2, wherein a first rib is provided on the top of the upper flange which is located in the first space around the contacts, and at a front side of an opening at the first end of the first ventilation slot to block the spatter generated during contacts ablation from entering the first ventilation slot, so that the first ventilation slot is configured to form a first clean area where the spatter in a creepage path between a normally open contact and a normally closed contact cannot fall in, thereby increasing a dielectric strength between the contacts after testing.

4. The hinge type relay according to claim 1, wherein the through-hole is provided at a position close to an edge of the upper flange.

5. The hinge type relay according to claim 1, wherein an iron core mounting hole is provided in the middle of the upper flange, and an iron core is assembled in the iron core mounting hole, and an iron core head configured as an iron core pole surface is exposed above the iron core mounting hole; the normally open stationary spring insertion portion and the normally closed stationary spring insertion portion are offset on one side of the upper flange with respect to the iron core mounting hole; a retaining wall is provided between the first space around the contacts and the pole surface of the iron core; the ventilation slot comprises a second ventilation slot provided on the retaining wall for connecting the first space around the contacts to the third space around the iron core pole surface.

6. The hinge type relay according to claim 5, wherein a periphery of the upper flange is provided with a perimeter wall corresponding to the perimeter of the iron core mounting hole; the perimeter wall is provided with a third ventilation slot, one end of the third ventilation slot is connected to the third space around the iron core pole surface and another end of the third ventilation slot is connected to outside of the perimeter wall; a second recess is provided on an outer side wall of the upper flange corresponding to the another end of the third ventilation slot, so that the another end of the third ventilation slot can be connected to the second space at the winding side through the second recess.

7. The hinge type relay according to claim 1, wherein the normally open stationary spring is inserted upside down in the first slot of the normally open stationary spring insertion portion, and the normally closed stationary spring is inserted upside down in the second slot of the normally closed stationary spring insertion portion, so that pins of the normally open stationary spring and the normally closed stationary spring are configured to protrude upward; the first portion of the normally open stationary spring with the stationary contact is abutted against the top of the upper flange, and the second portion of the normally closed stationary spring with the stationary contact is overhung above the upper flange.

8. The hinge type relay according to claim 7, wherein the relay further comprises a base plate, the base plate is mounted on the top of the normally open stationary spring insertion portion and the normally closed stationary spring insertion portion; a second rib is provided on the base plate at a position close to a side wall of the normally closed stationary spring insertion portion, and the side wall is a side wall of the normally closed stationary spring insertion portion close to the normally open stationary spring insertion portion, and the second rib is configured to protrude downward, so as to block a spatter generated during contacts ablation and splash from adhering to the side wall of the normally closed stationary spring insertion portion, forming a second clean area where the spatter in the creepage path between a normally open contact and a normally closed contact cannot fall in, thereby increasing a dielectric strength between the contacts after testing.

9. The ultra-miniature hinge type relay having high dielectric strength between contacts and long service life according to claim 2, wherein an iron core mounting hole is provided in the middle of the upper flange, and an iron core is assembled in the iron core mounting hole, and an iron core head configured as an iron core pole surface is exposed above the iron core mounting hole; the normally open stationary spring insertion portion and the normally closed stationary spring insertion portion are offset on one side of the upper flange with respect to the iron core mounting hole; a retaining wall is provided between the first space around the contacts and the pole surface of the iron core; the ventilation slot comprises a second ventilation slot provided on the retaining wall for connecting the first space around the contacts to a third space around the iron core pole surface.

10. The ultra-miniature hinge type relay having high dielectric strength between contacts and long service life according to claim 9, wherein a periphery of the upper flange is provided with a perimeter wall corresponding to the perimeter of the iron core mounting hole; the perimeter wall is provided with a third ventilation slot, one end of the third ventilation slot is connected to the third space around the iron core pole surface and another end of the third ventilation slot is connected to outside of the perimeter wall; a second recess is provided on an outer side wall of the upper flange corresponding to the another end of the third ventilation slot, so that the another end of the third ventilation slot can be connected to the second space at the winding side through the second recess.

11. The ultra-miniature hinge type relay having high dielectric strength between contacts and long service life according to claim 2, wherein the normally open stationary spring is inserted upside down in the first slot of the normally open stationary spring insertion portion and the normally closed stationary spring is inserted upside down in the second slot of the normally closed stationary spring insertion portion, so that pins of the normally open stationary spring and the normally closed stationary spring are configured to protrude upward; the first portion of the normally open stationary spring with the stationary contact is abutted against the top of the upper flange, and the second portion of the normally closed stationary spring with the stationary contact is overhung above the upper flange.

12. The ultra-miniature hinge type relay having high dielectric strength between contacts and long service life according to claim 11, wherein the relay further comprises a base plate, the base plate is mounted on the top of the normally open stationary spring insertion portion and the normally closed stationary spring insertion portion; a second rib is provided on the base plate at a position close to a side wall of the normally closed stationary spring insertion portion, and the side wall is a side wall of the normally closed stationary spring insertion portion close to the normally open stationary spring insertion portion, and the second rib is configured to protrude downward, so as to block a spatter generated during contacts ablation and splash from adhering to the side wall of the normally closed stationary spring insertion portion, forming a second clean area where the spatter in the creepage path between a normally open contact and a normally closed contact cannot fall in, thereby increasing a dielectric strength between the contacts after testing.

* * * * *